(12) United States Patent
Radermacher

(10) Patent No.: US 7,448,608 B2
(45) Date of Patent: Nov. 11, 2008

(54) FOLDABLE FRAME FOR OSCILLATING SAWS

(75) Inventor: Uwe Radermacher, Weibern (DE)

(73) Assignee: Wolfcraft GmbH (DE)

( * ) Notice: Subject to any disclaimer, the term of this patent is extended or adjusted under 35 U.S.C. 154(b) by 347 days.

(21) Appl. No.: 11/118,606

(22) Filed: Apr. 29, 2005

(65) Prior Publication Data

US 2006/0226311 A1 Oct. 12, 2006

(30) Foreign Application Priority Data

Mar. 8, 2005 (DE) .................. 10 2005 010 354

(51) Int. Cl.
B25B 1/00 (2006.01)
(52) U.S. Cl. .................. 269/139; 269/138; 144/267
(58) Field of Classification Search .......... 269/139, 269/138, 221–224, 16–17, 250–253, 244; 144/287, 286, 267, 266
See application file for complete search history.

(56) References Cited

U.S. PATENT DOCUMENTS

| | | | |
|---|---|---|---|
| 4,294,441 A * | 10/1981 | O'Banion et al. ............. | 269/97 |
| 4,860,807 A | 8/1989 | Vacchiano | |
| 4,974,651 A | 12/1990 | Carmon et al. | |
| 5,004,029 A | 4/1991 | Garner | |
| 5,119,903 A | 6/1992 | Ulshafer, Jr. | |
| 5,193,598 A | 3/1993 | Estrem | |
| 5,386,365 A * | 1/1995 | Nagaoka ..................... | 701/44 |
| 5,501,158 A | 3/1996 | Cheney | |
| 5,592,981 A | 1/1997 | Derecktor | |
| 5,836,365 A | 11/1998 | Derecktor | |
| 6,318,713 B1 * | 11/2001 | Levi ............................ | 269/139 |
| 6,588,775 B2 * | 7/2003 | Malone, Jr. ................. | 280/47.18 |
| 6,619,643 B1 * | 9/2003 | Hayday ...................... | 269/139 |
| 6,745,804 B2 | 6/2004 | Welsh et al. | |
| 6,749,189 B1 * | 6/2004 | Wolff et al. .................. | 269/139 |
| 6,779,466 B2 * | 8/2004 | Shabram, Jr. ................ | 108/35 |
| 6,848,684 B2 * | 2/2005 | Fortin et al. ................. | 269/139 |
| 6,883,793 B2 * | 4/2005 | Fortin et al. ................. | 269/139 |
| 7,337,728 B2 * | 3/2008 | Shabram et al. ............. | 108/35 |
| 2003/0070591 A1 * | 4/2003 | Shabram, Jr. ................ | 108/35 |
| 2004/0250901 A1 | 12/2004 | Ursell et al. | |

(Continued)

FOREIGN PATENT DOCUMENTS

DE 8615685 9/1986

(Continued)

Primary Examiner—Lee D Wilson
(74) Attorney, Agent, or Firm—Bell Boyd & Lloyd

(57) ABSTRACT

The invention relates to a foldable frame (1) for oscillating saws or the like with an elongated support body (2), to which the oscillating saw is mountable, and to which, at each one of its two respective ends, are connected two legs (6,7), the latter being swivelable from a storage configuration in which they extend essentially parallel to the support body (2) to an operative configuration in which they extend essentially perpendicular from the support body (2). In order to improve the usefulness of the above-described foldable frame, it is proposed that the support body (2) be configured as two support body sections (3, 4), which are connected to one another by a hinge (5), which in the storage configuration lie parallel to each other, and which by swivelling movement through 180° can be brought into the operative configuration.

39 Claims, 16 Drawing Sheets

U.S. PATENT DOCUMENTS

2004/0250903 A1  12/2004  Welsh

FOREIGN PATENT DOCUMENTS

| | | |
|---|---|---|
| DE | 10303115 A1 | 8/2003 |
| DE | 102005010354 | 9/2006 |
| EP | 1410881 | 12/2006 |
| GB | 2397269 | 7/2004 |
| WO | 2004050309 | 6/2004 |

* cited by examiner

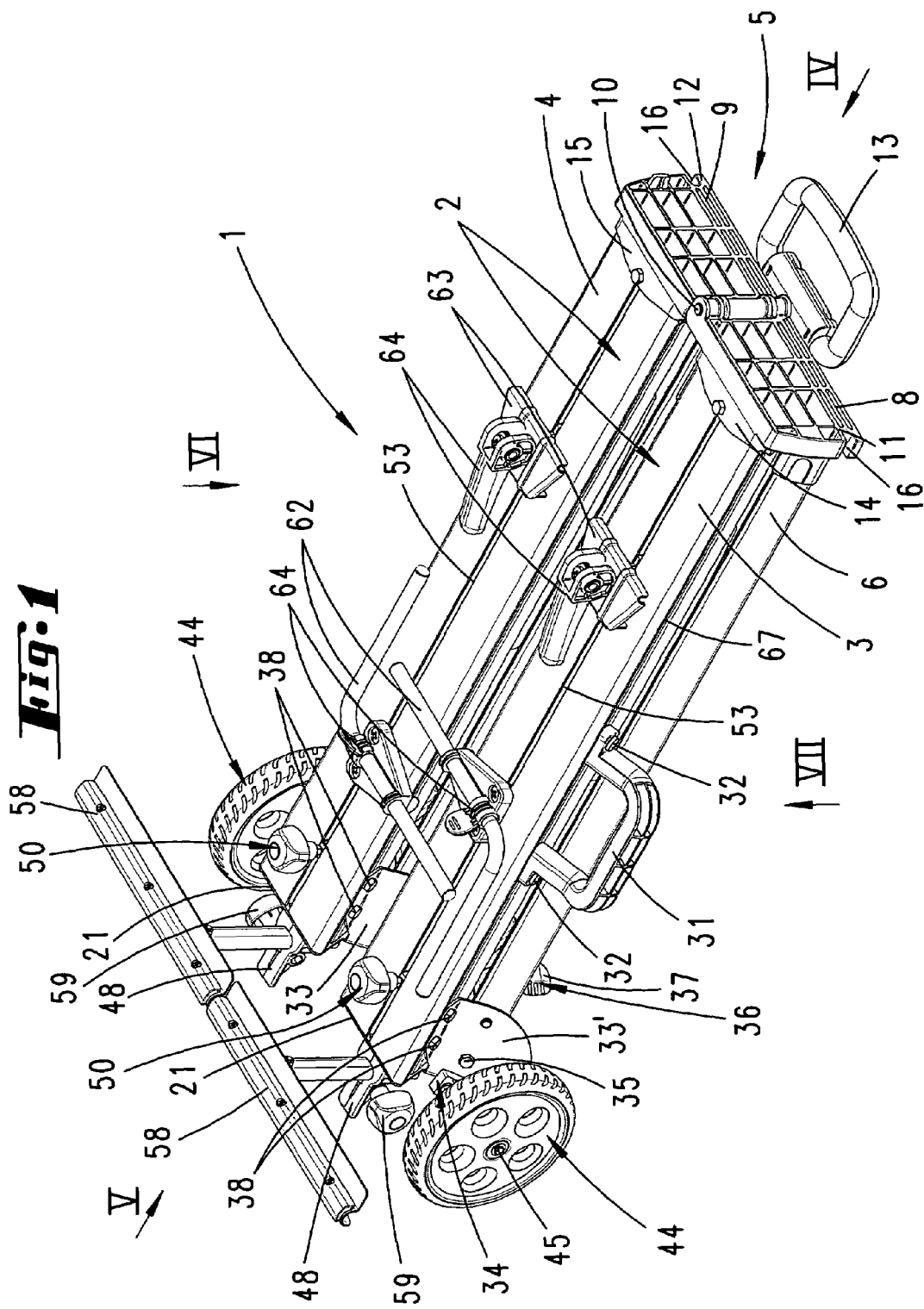

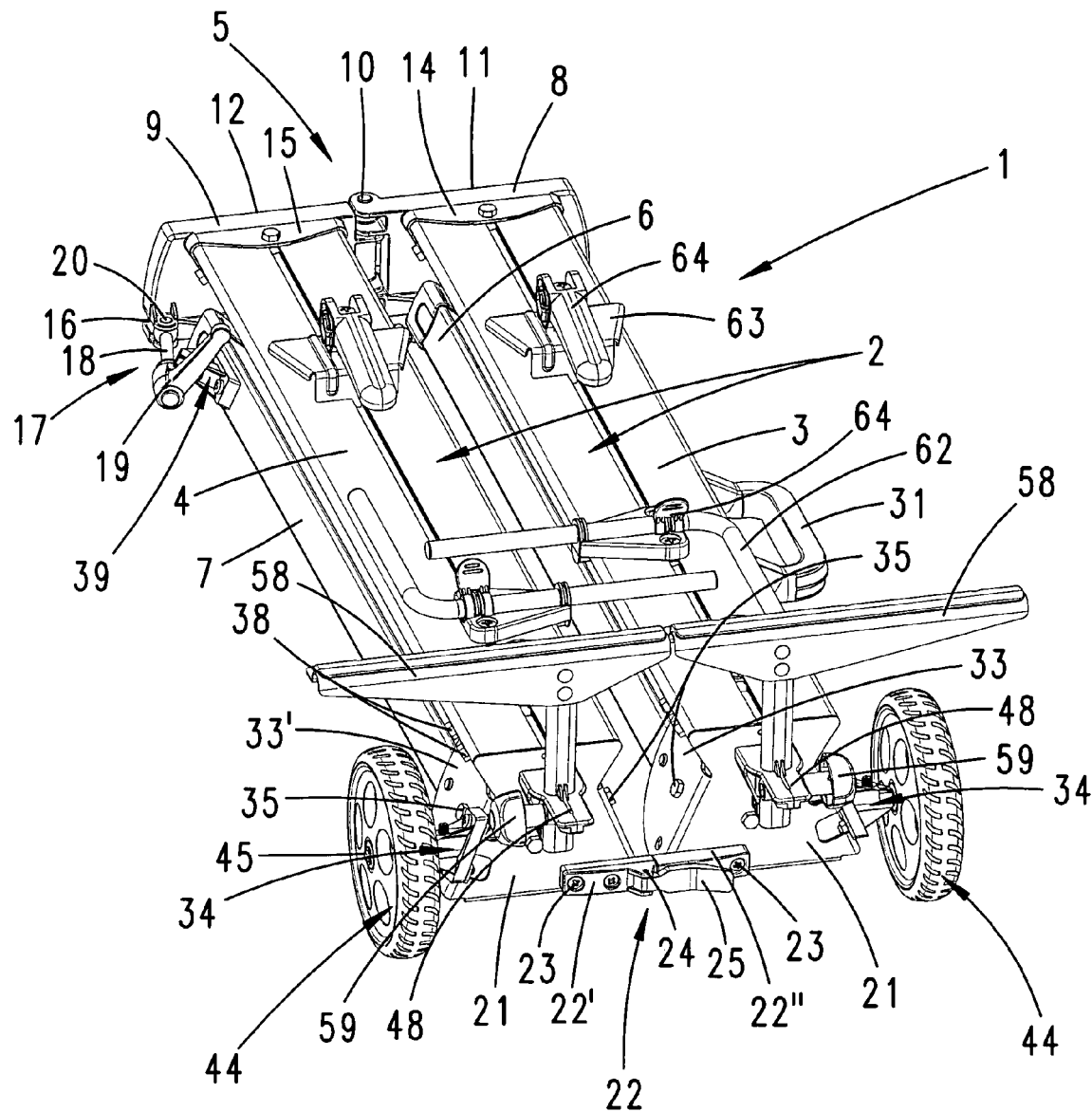

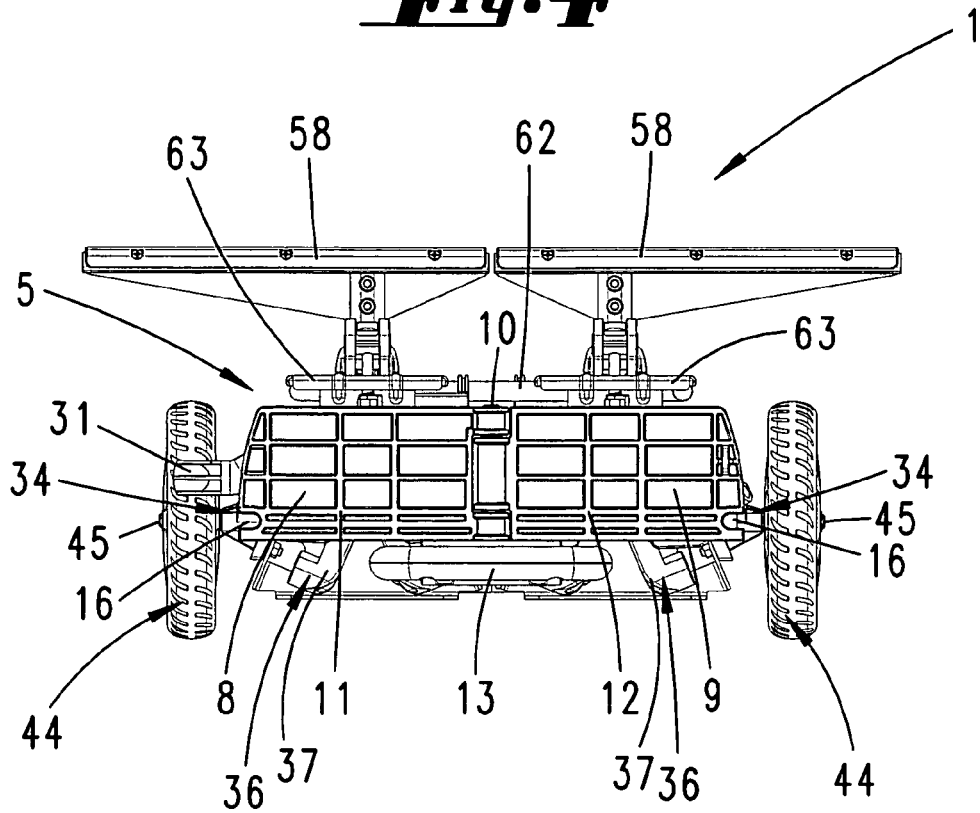
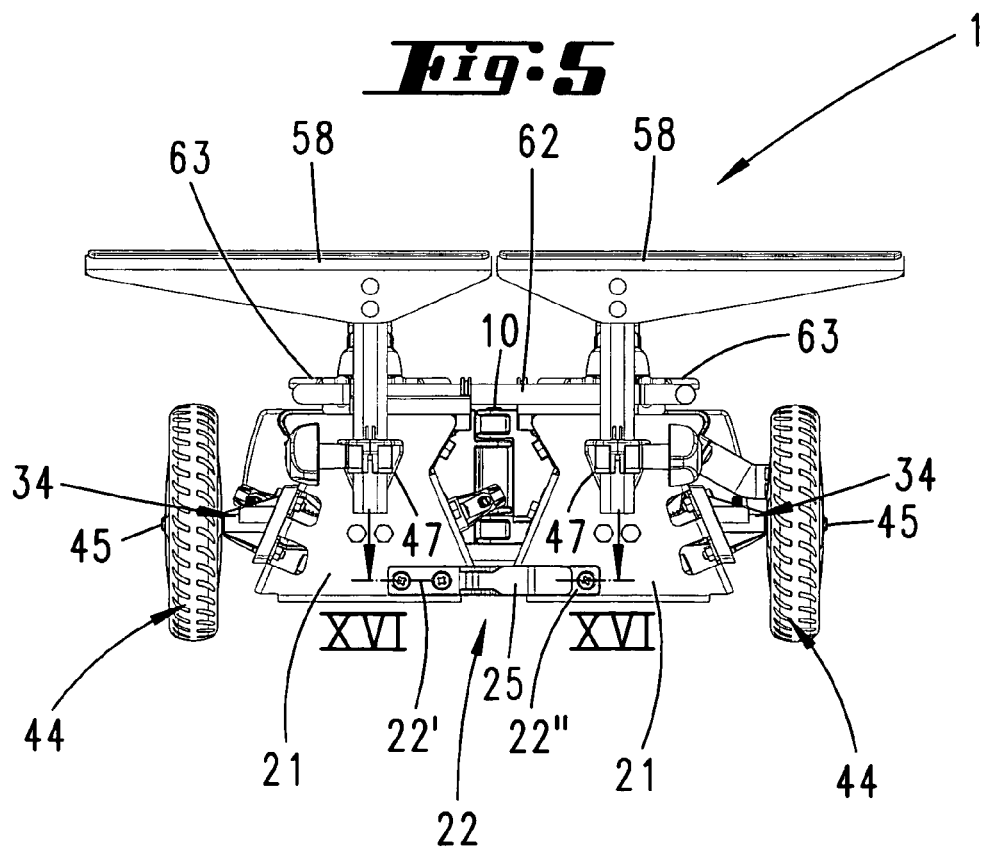

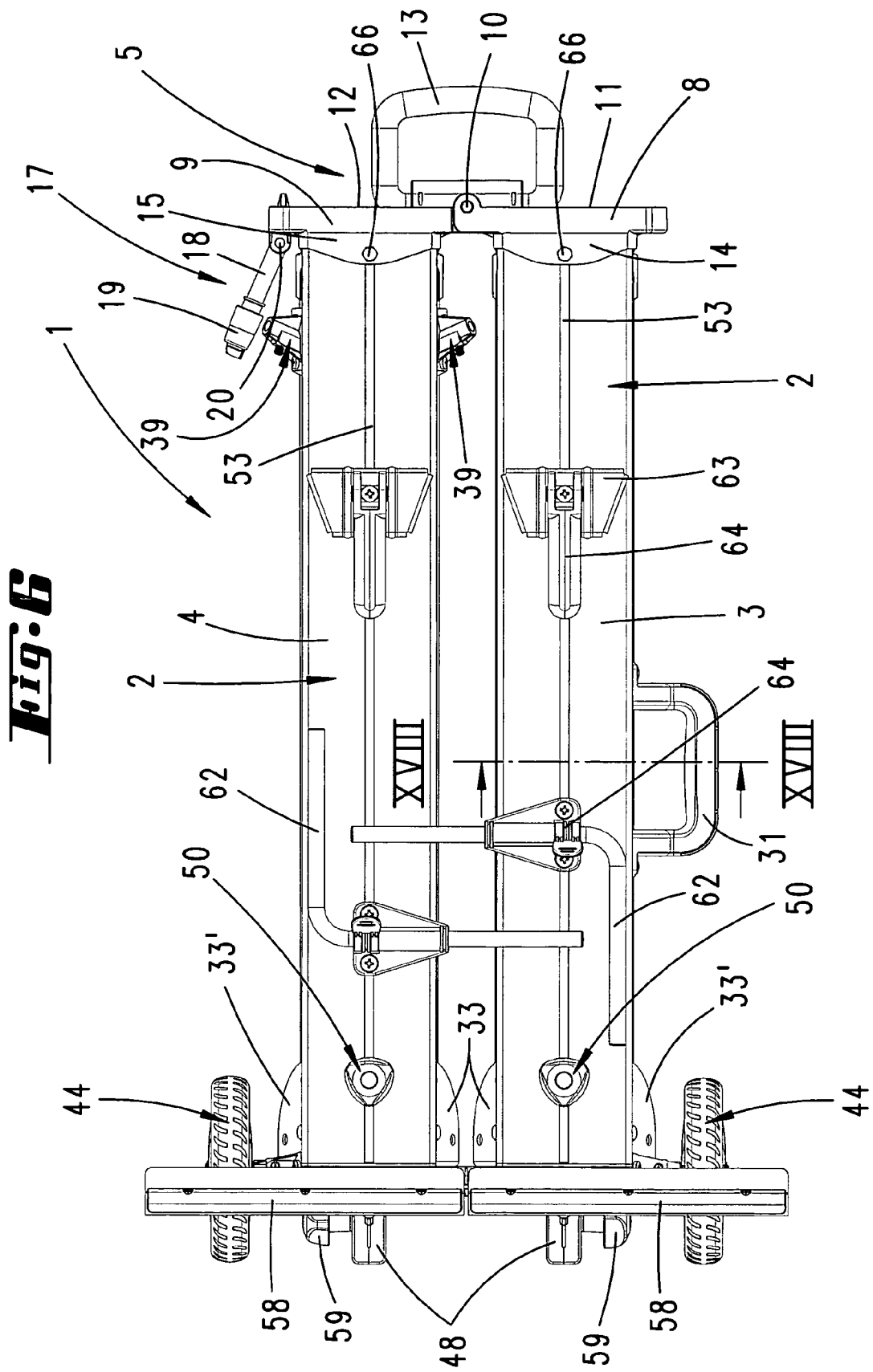

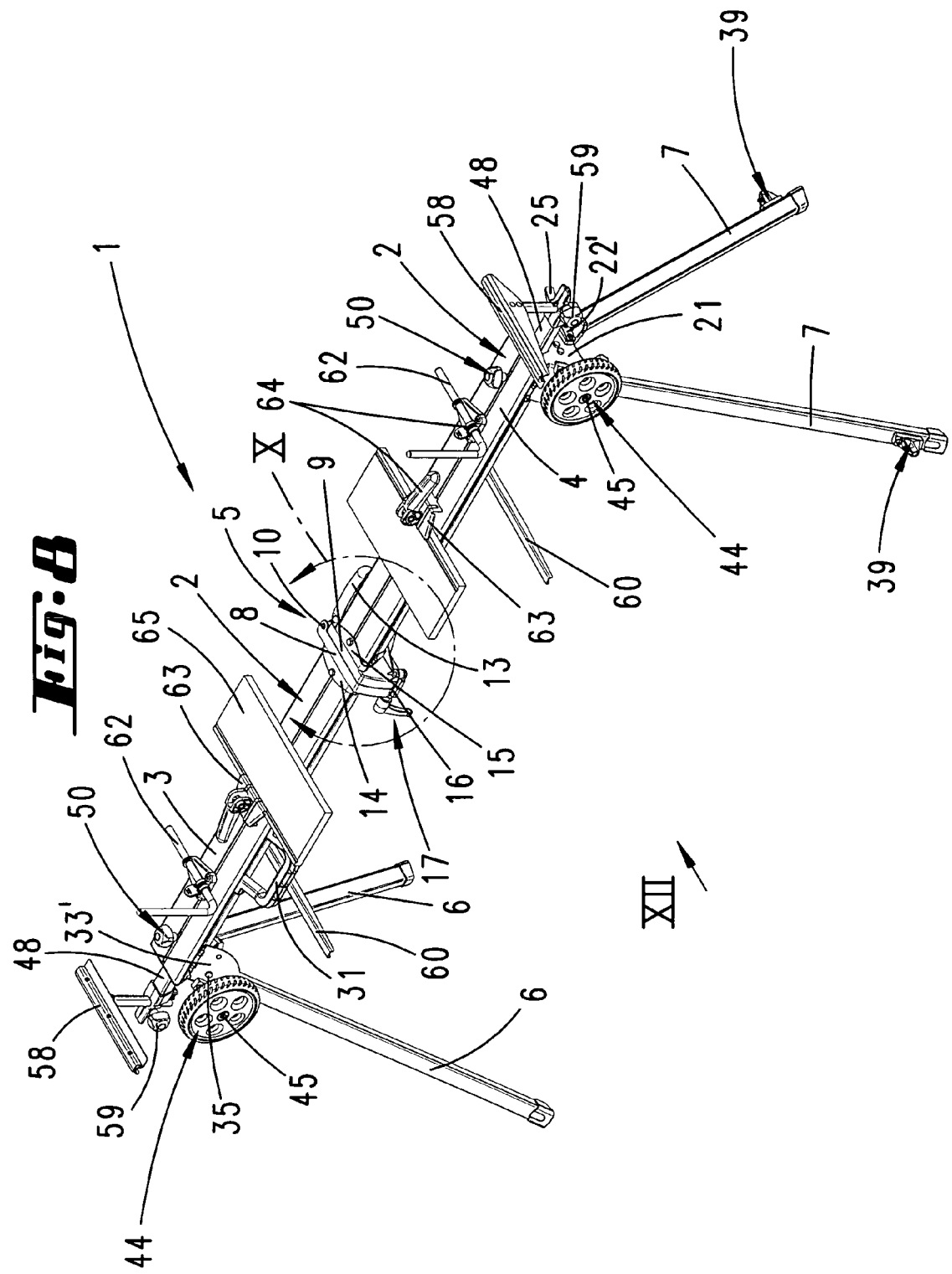

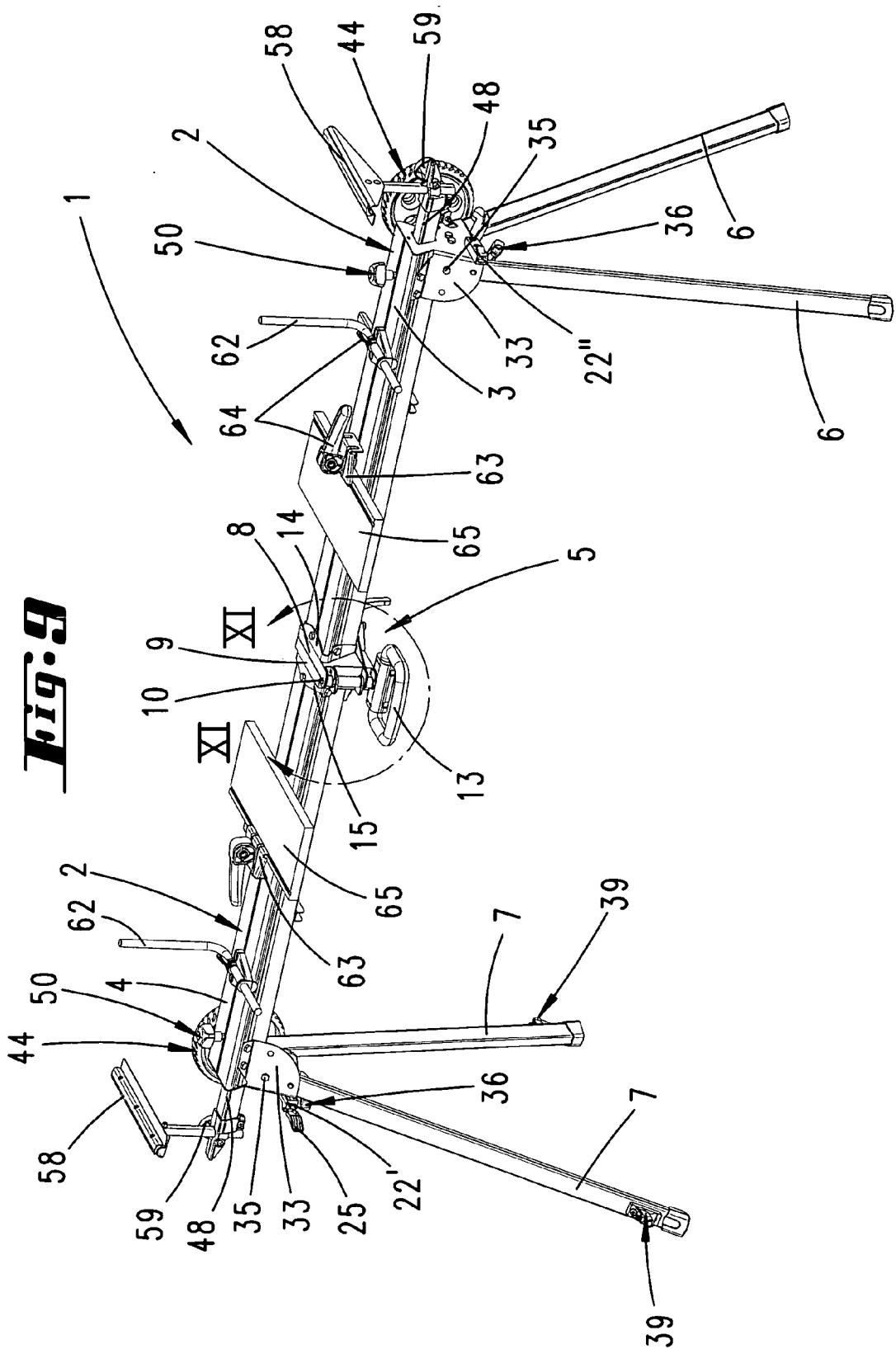

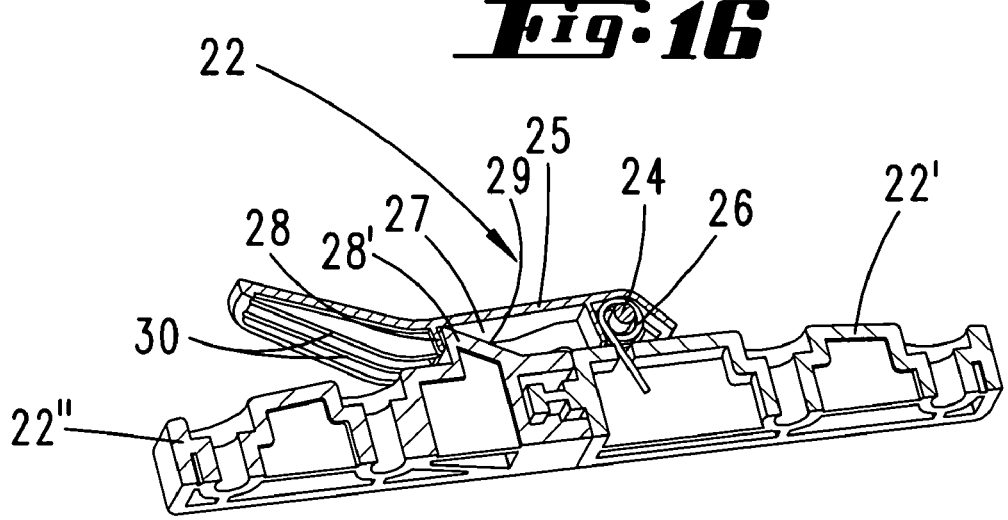
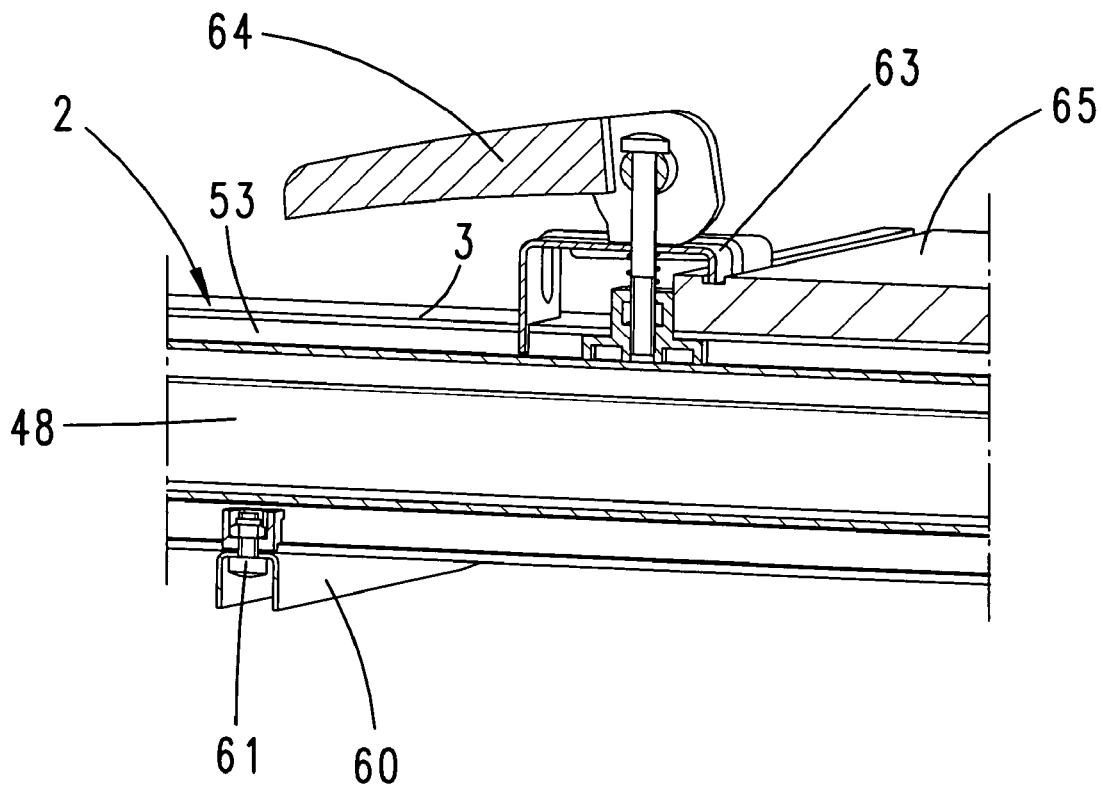

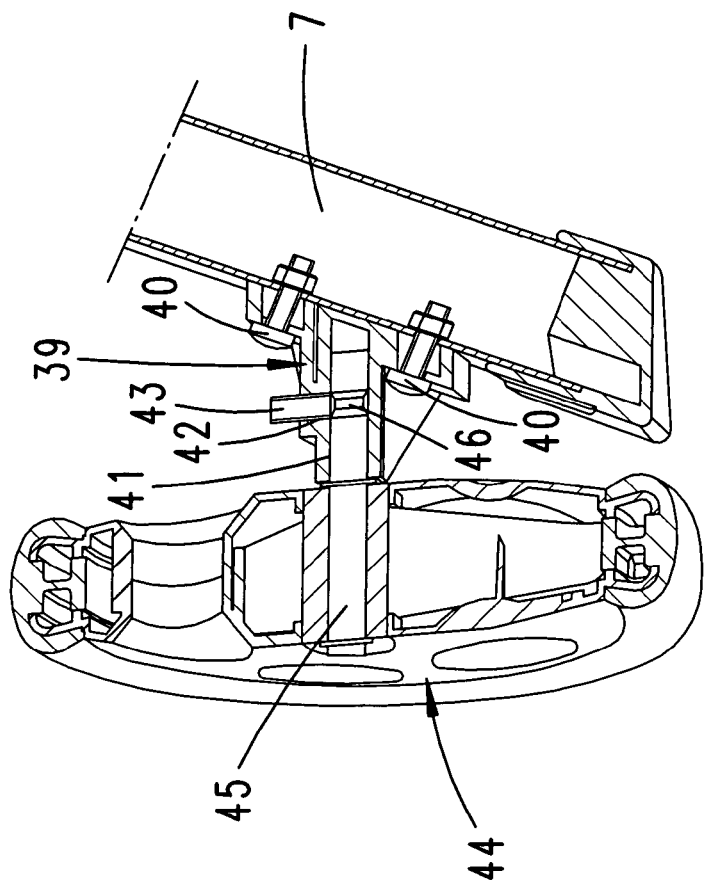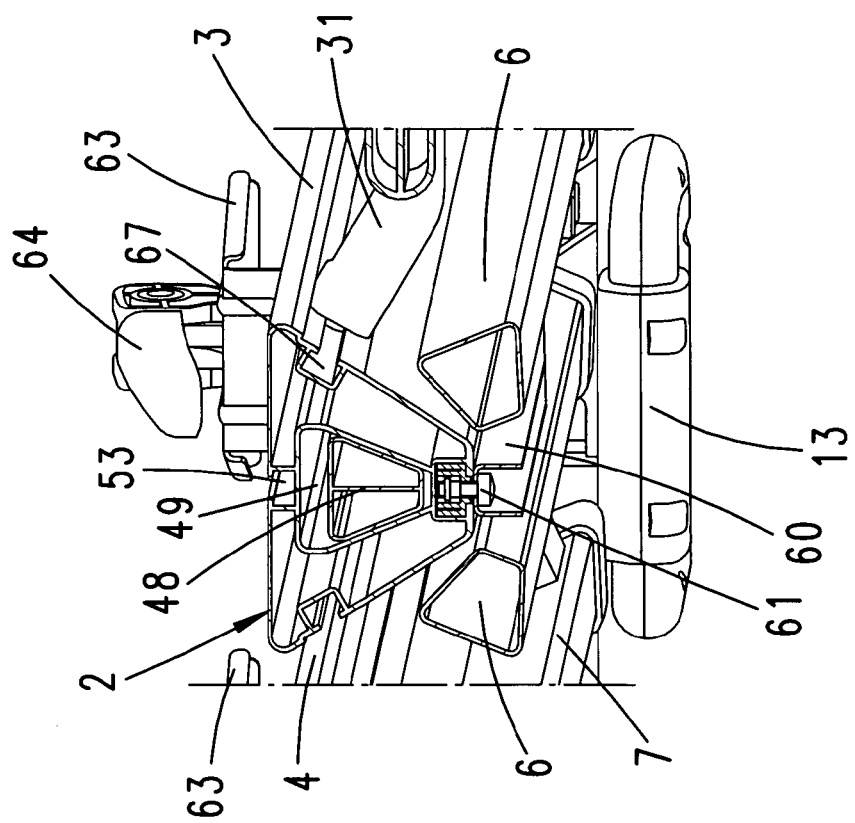

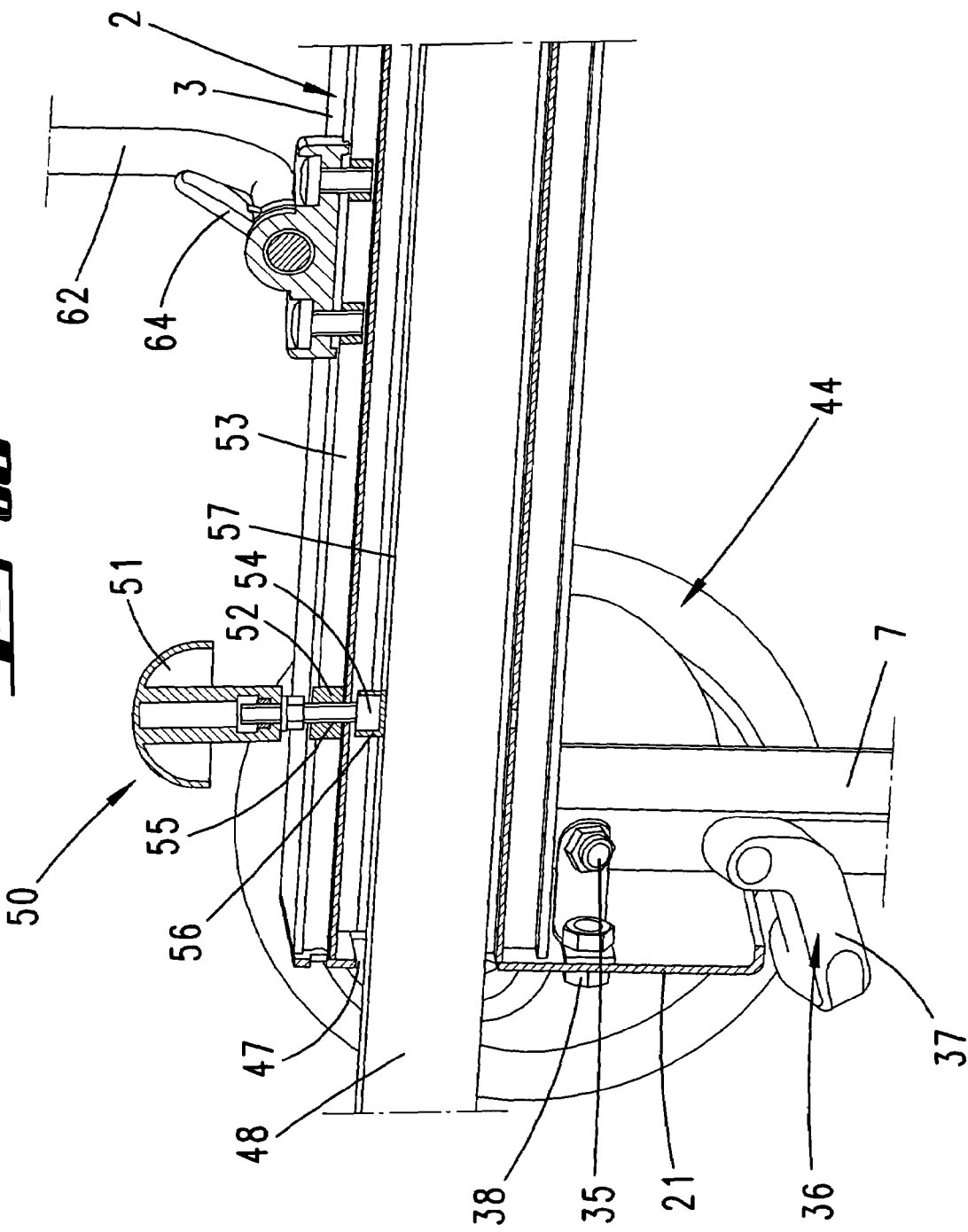

FOLDABLE FRAME FOR OSCILLATING SAWS

PRIORITY CLAIM

This application is claims priority from German application number 102005010354.5 filed Mar. 8, 2005, the entire disclosure of which is herein incorporated by reference.

CROSS REFERENCE TO PRIOR APPLICATIONS

The present application relates to the following commonly-owned pending patent pplicatiion, U.S. patent application Ser. No. 10/503,172 filed on Mar. 14, 2005.

FIELD OF THE INVENTION

The invention pertains to a foldable frame for oscillating saws or the like with an elongated support body, to which the oscillating saw is mountable, and to which, at each one of its two respective ends, are connected two legs, the latter being swivelable from a storage configuration in which they extend essentially parallel to the support body to an operative configuration in which they extend essentially perpendicular from the support body.

DESCRIPTION OF THE PRIOR ART

A frame of the kind just mentioned, capable of folding together, is known from US 2004/0250903 A-1. This foldable frame likewise consists of an elongated support body having, at each of the two ends, two legs in connection. In the operative configuration, the legs extend essentially perpendicular from the support body. In the storage configuration the legs are so pivoted that they lie almost parallel with the support body.

A similarly foldable frame is known from DE 10303115. In this case the foldable frame also includes a support body, at each end of which likewise two legs are attached. In essence, the legs in this patent function as described in the above-mentioned U.S. 2004/0250903A-1.

It is an object of the invention to advantageously improve the structure of the above-described foldable frame to improve its function.

This object is attained both by the individual claims and by any combination of claims with any desired other claim.

SUMMARY OF THE INVENTION

To begin, Claim 1 proposes essentially that the support body have two support body sections connected together by way of a hinge, the sections being parallel to each other in the storage configuration, but being capable of assuming an operative configuration by swivelling through 180°.

Preferably the hinge is so provided that, in the operative configuration, it has a vertically positioned hinge axis. In order to restrain the two hinge-remote ends of the support body sections in the storage configuration, the two hinge-remote ends have a closure. The closure provides in particular a spring-biased stop hook. In the operative configuration, the hinge is fixed with a restraining member. The restraining member lies on the side of the hinge which is turned away from the hinge axis, and is constituted in particular by a tension bolt. The tension bolt is linked to one of the two hinge halves. In the restrained condition, the tension bolt extends through edge-open notches of both hinge halves. The hinge is constructed of two half hinges, each having a front face. In the operative configuration, the front faces lie against one another and in the storage configuration they are in alignment with one another. A hand grip is provided for the hinge, the hand grip being in particular secured to the hinge axis. The hand grip, in the operative configuration, lies under the hinge halves and in the storage configuration it lies ahead of the front faces. On one support body section a support handle is located to one side. On each free end of each support body section there is provided a running wheel. The running wheels are provided on the outwardly lying side. In the storage condition, the axes are approximately in alignment with each other. Each running wheel is secured to a wedge. The legs are also connected with the said wedges. The axes of the running wheels lodge in openings of bearing blocks. It is also possible to assign the running wheels to the free ends of two legs. In the operative configuration, the two support body sections are aligned with one another. The support body sections are made from profile bodies. Essentially, the profile bodies exhibit a trapezoidal cross-section. The profile bodies are received in pockets of the hinge halves. In the end region, extension pieces project into the profile bodies, and are capable of being pulled out. The extension pieces likewise exhibit a trapezoidal section and lie displaceably and securably in form-matching hollows in the profile bodies. Against the base surface of a trapezoidal elongation piece operates a securement means. The profile bodies exhibit grooves in which stops, support plate holders or the like ride or are secured. The stops, support plate holders or the like are clampable with the profile body utilizing the eccentric snap closure in the grooves.

BRIEF DESCRIPTION OF THE DRAWINGS

The above-described invention will now be described in greater detail utilizing an example embodiment. In the figures, FIG. 3 is a perspective view of the foldable frame with a view of the closure, FIG. 4 is a side view in accordance with the line of sight IV in FIG. 1, FIG. 5 is a side view in accordance with the line of sight V in FIG. 1, FIG. 6 is a plan view in accordance with the line of sight VI in FIG. 1, FIG. 7 is a bottom view taken along the line of sight VII in FIG. 1, FIG. 8 is a perspective view of the folded frame in the operative configuration taken along the line of sight defined by the tension bolt, FIG. 9 is a perspective view of the foldable frame in the operative configuration along the line of sight directed toward the handle, FIG. 16 is a perspective view of the closure sectioned along the line XVI-XVI, FIG. 17 is a perspective view of the Section according to the line XVII-XVII in FIG. 13, FIG. 18 is a perspective view which is sectioned in accordance with the line XVIII-XVIII in FIG. 6, FIG. 19 is a perspective view of the running wheel which has been sectioned according to the line XIX-XIX in FIG. 15, and FIG. 20 is a perspective view which has been sectioned in accordance with the line XX-XX in FIG. 13.

DETAILED DESCRIPTION OF THE INVENTION

Figure 2:
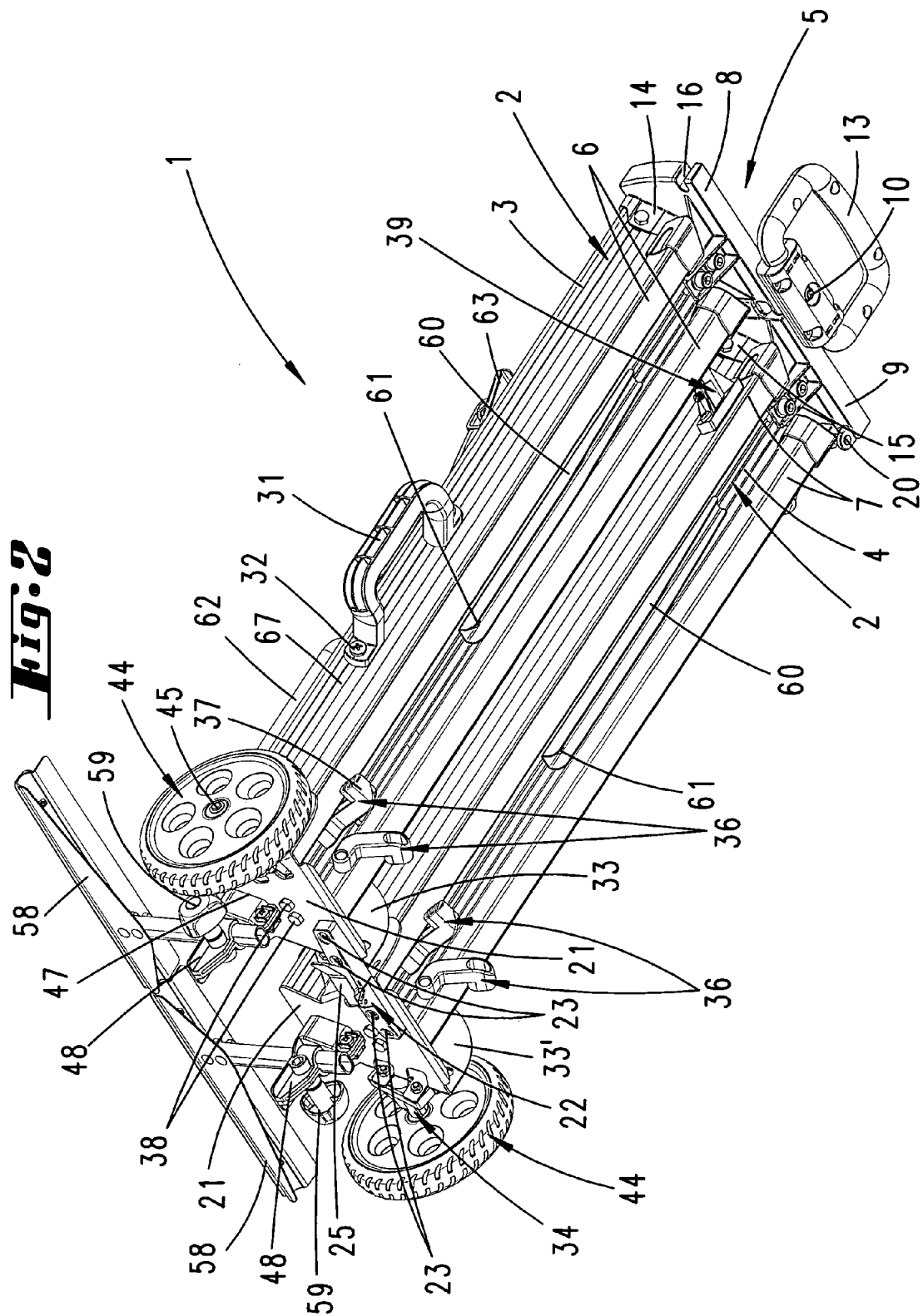
FIG. 2 shows a perspective bottom plan view of the foldable frame.
Figure 1:
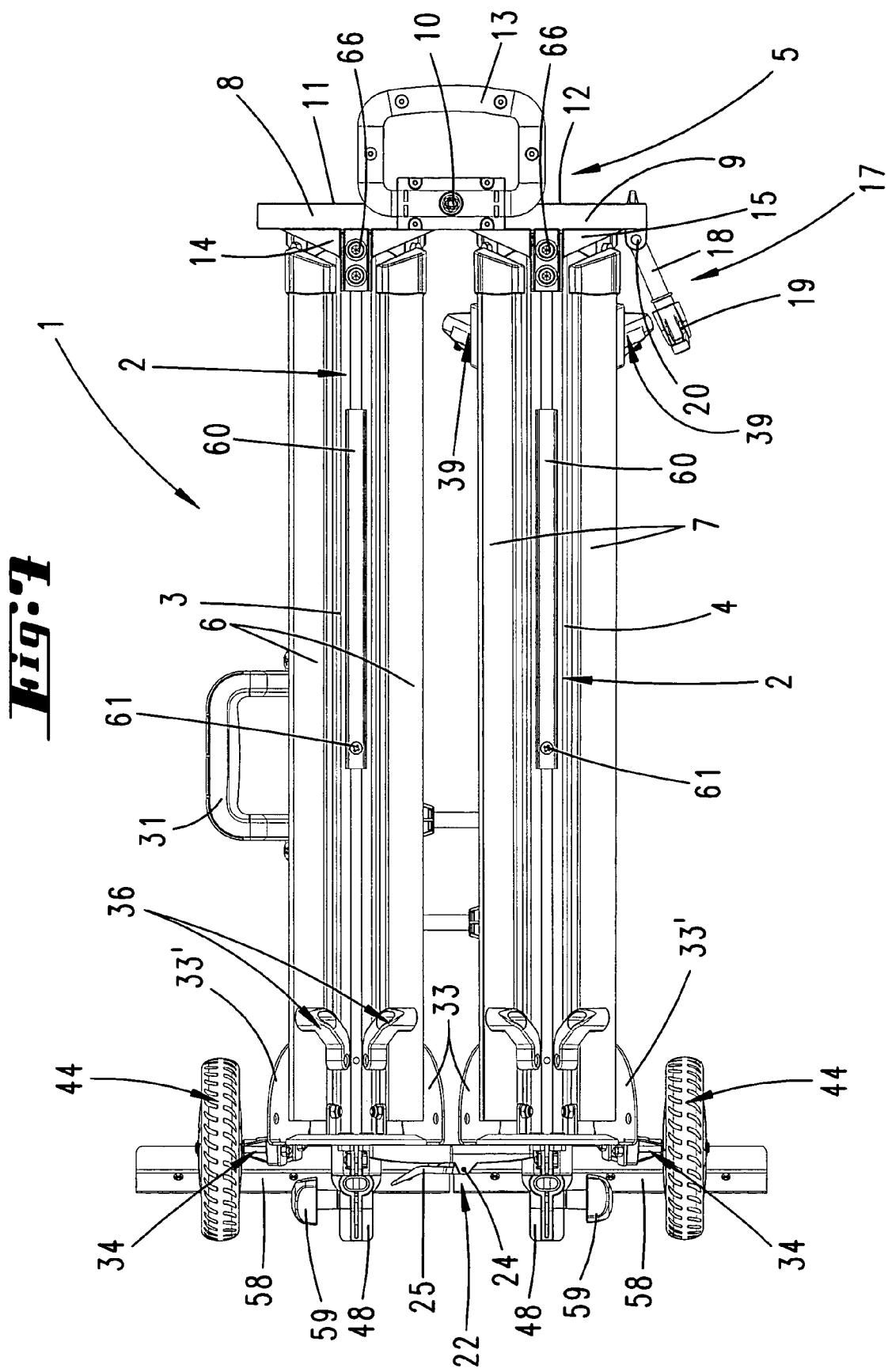
FIG. 1 shows a perspective plan view of the foldable frame.
Figure 10:
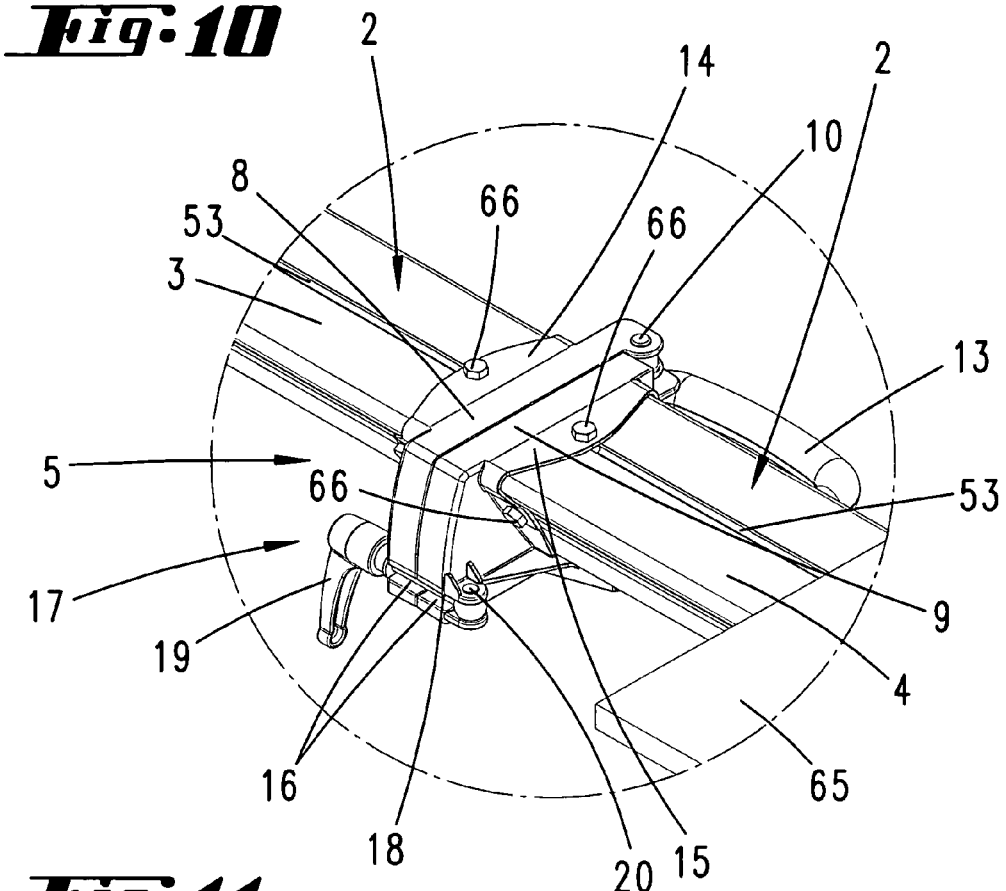
FIG. 10 is a magnified view in accordance with X in FIG. 8.
Figure 11:
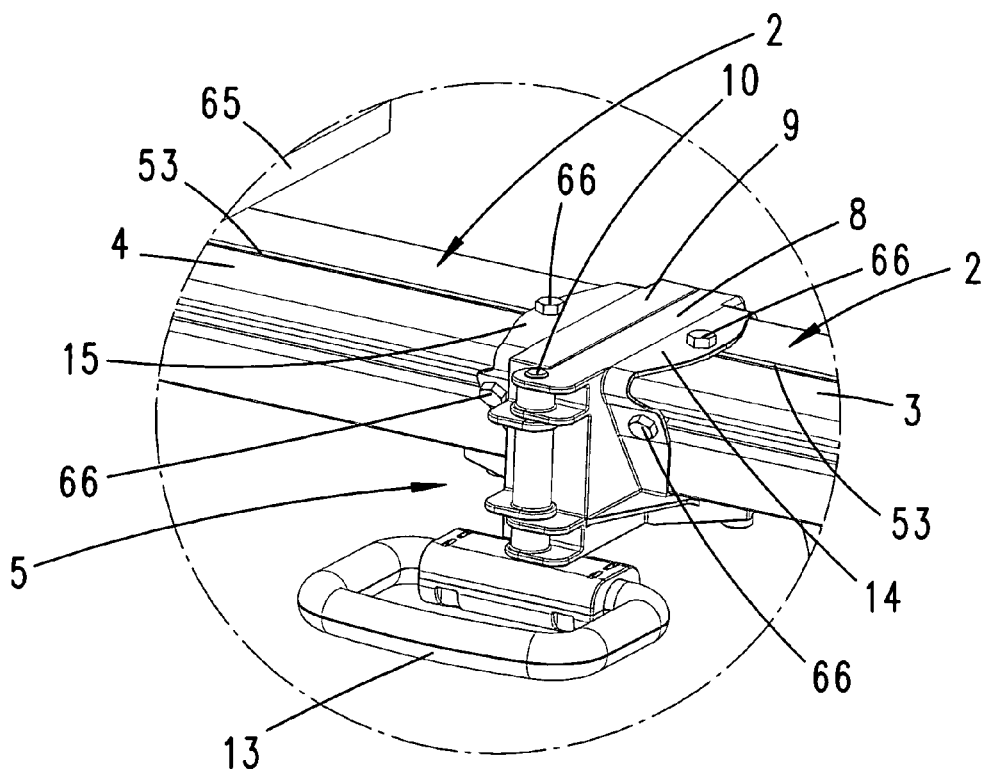
FIG. 11 is a magnified view according to XI in FIG. 9.
Figure 12:
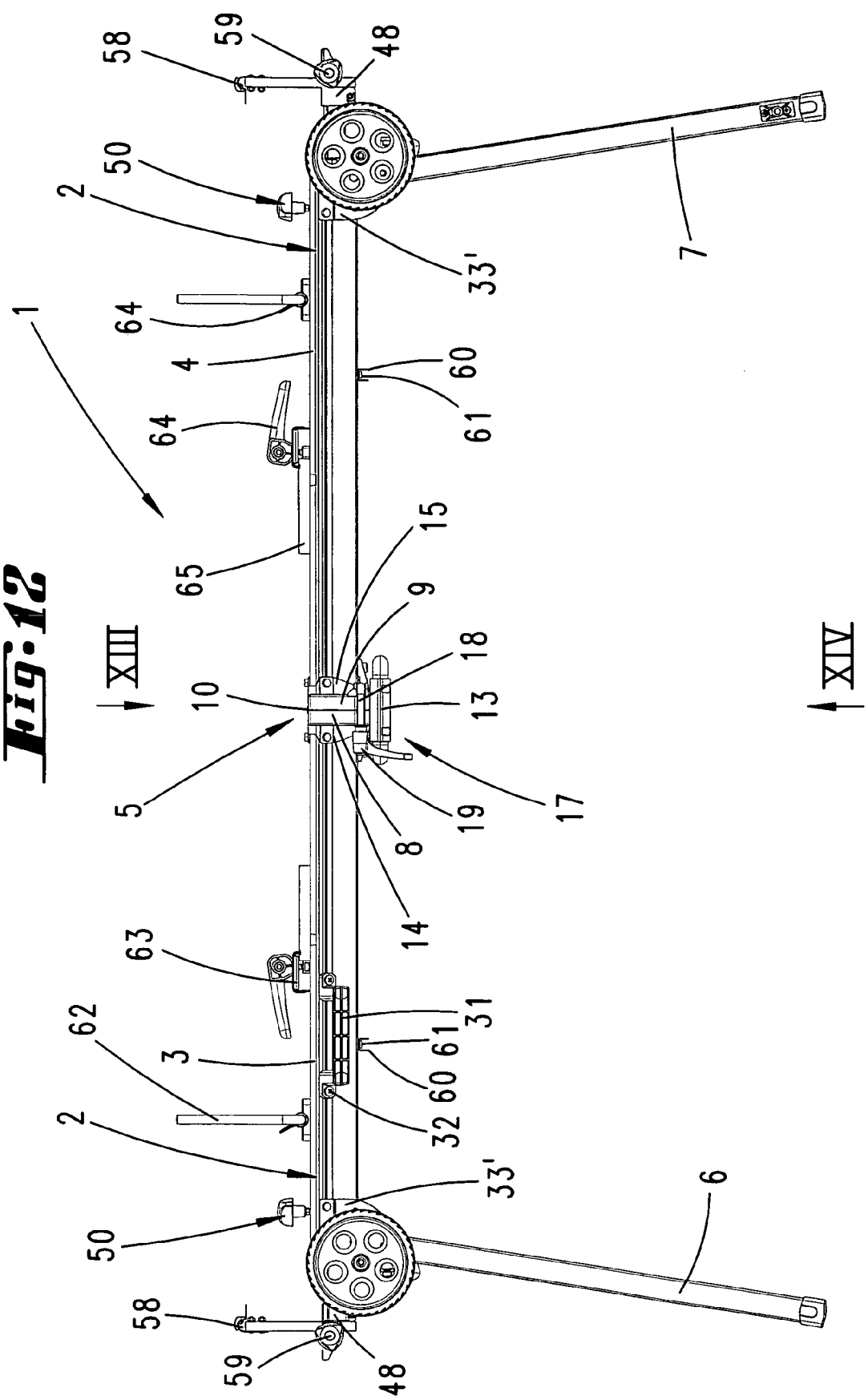
FIG. 12 is a front view in accordance with the line of sight XII in FIG. 8.
Figure 13:
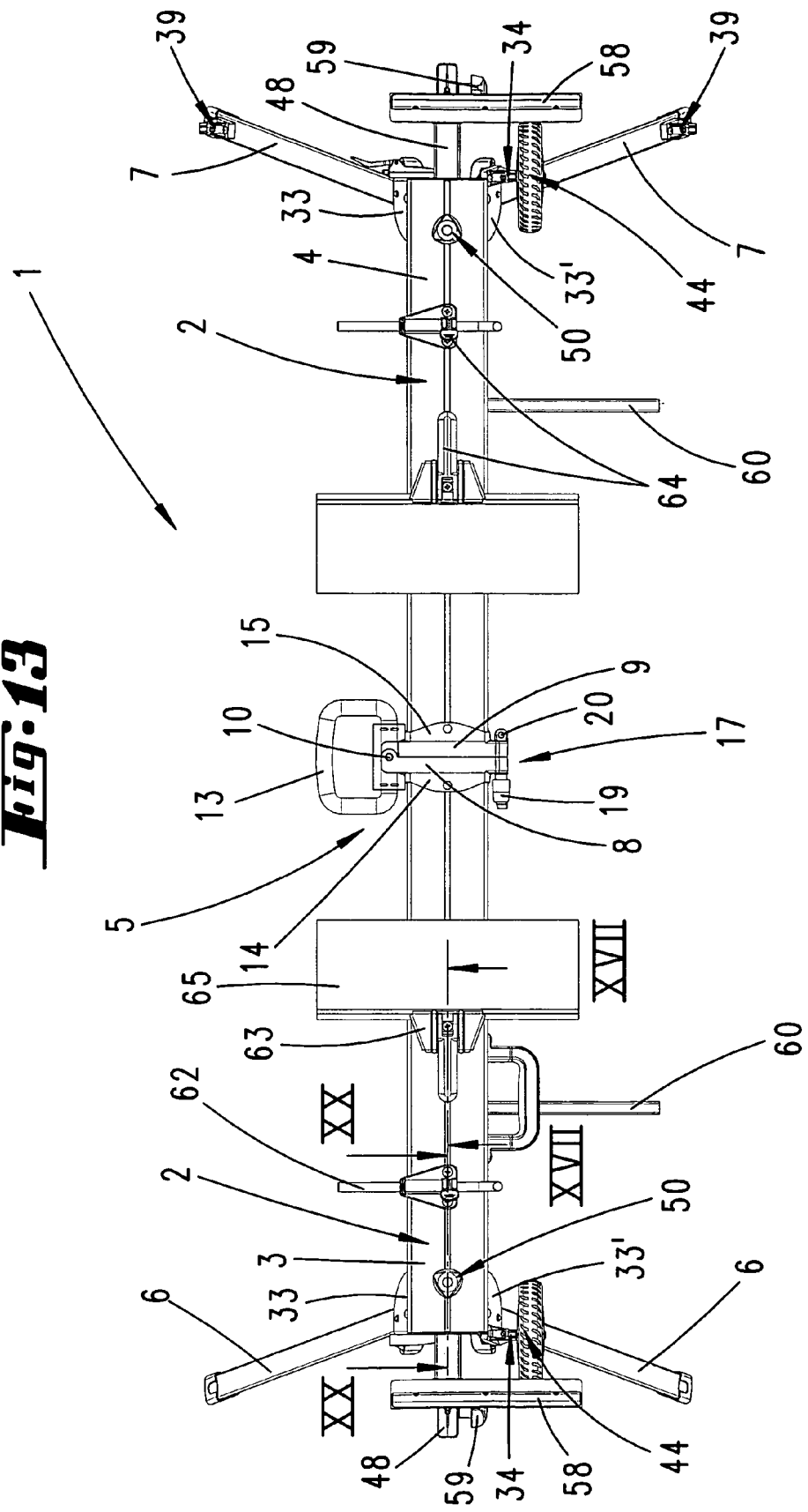
FIG. 13 is a plan view according to the line of sight XIII in FIG. 12.
Figure 14:
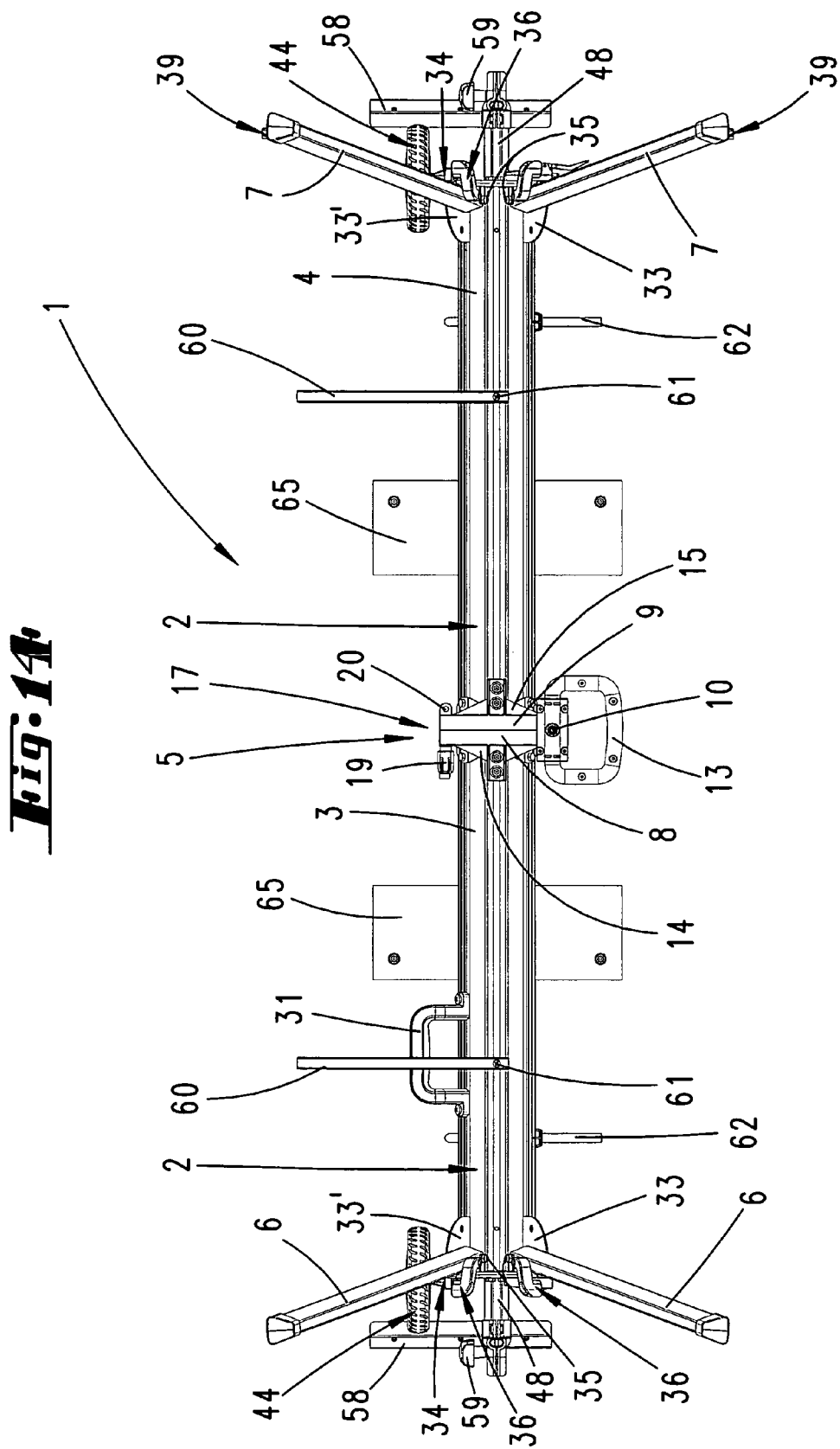
FIG. 14 is a bottom plan view according to the line of sight XIV in FIG. 12.

Exemplary of the invention is a foldable frame, in particular a frame 1, to which an oscillating saw is secured. In particular, the frame 1 consists of a support body 2 which has two support body sections 3, 4, a hinge 5 which connects the two support body sections 3, 4 with each other, and a pair of legs 6, 7.

The support body sections 3, 4 consist of profile bodies of equal length which have essentially a trapezoidal section (see FIG. 18). Normally, these are made of aluminum. In a storage configuration the support body sections 3, 4 lie parallel to each other, as also do the leg pair 6, 7. The leg pair 6, 7 lie sideward adjacent the support body sections 3, 4. In an operative configuration, the support body sections 3, 4 extend in alignment horizontally with respect to each other. The legs of the leg pair 6, 7 project downward.

The hinge 5 consists of two half-hinges 8, 9. The two hinge halves 8, 9, made of plastic, are connected with each other at a hinge axis 10. In the operative configuration, the hinge axis 10 lies vertically. The two hinge-halves 8, 9 form front faces 11, 12 respectively. In the storage configuration (FIG. 1 to FIG. 7), the front faces 11, 12 lie in alignment relative to each other. In the operative configuration (FIG. 9 to FIG. 15), the front faces 11, 12 lie flat with regard to each other.

A handle 13 is provided for the hinge 5 on its under side. The handle 13, in the example embodiment, is secured to the hinge axis 10.

Rearward from the front faces 11, 12, the hinge 5 provides on each hinge-half 8, 9 a pocket 14, 15. In the pockets 14, 15, the support body sections 3, 4 are received, the latter being fixed within the pockets 14, 15 by way of screws 66. At the end of the hinge-halves 8, 9, opposite the hinge axis 10, are provided respective edge-opening notches 16.

In FIG. 3, it can be seen that, rearward on the hinge-half 9, there is provided a captive member 17. The captive member is provided by a tension rod 18. At the free end of the tension rod 18, there is provided a tension lever 19. The tension lever 19, by way of an internal thread, is screwed onto the tension rod 18 so that the tension rod, at its free end, exhibits an external thread. The captive member 17 is mounted to achieve pivotal movement about an axis 20 extending parallel to the hinge axis 10.

The ends of the support body sections 3, 4 extending from the hinge 5 are closed by sealing plates 21. The sealing plates 21 are secured to the support body sections by screws 38. In order to fix the support body sections 3, 4 in parallel condition when in the storage configuration, a closure 22 is provided on the sealing plate 21. The closure 22 consists of two halves 22', 22". The closure 22 is well pictured in FIG. 3 and FIG. 16. The two halves 22', 22" are each secured to a sealing plate 21 of a support body section 3, 4. The half 22' is secured to the support body section 4, and the half 22" is secured to the support body section 3. The halves 22', 22" are respectively by way of screws 23 secured to the sealing plate 21. The sealing half 22' provides a pivot axis 24 for a closure lever 25. The closure lever 25 is resiliently biased in the direction of the closed position by a swivel rotary spring 26. The closure lever 25 forms at its lower end a stophook 28 and a stophook pocket 27. The latter engages a stophook 28' which is formed by the closure half 22". The stophook 28' forms a control slope 29. The closure lever 25 forms run-up ribs 30 in the handle region.

Laterally located on the support body section 3 is a handle 31. The handle 31 is secured about midway of the support body section 3. The securement of the handle 31 is achieved using screws 32 which threadably engage nut members that in turn engage a lateral groove 67.

The end-region positioned sealing plates 21 each provide, on the respective side of the support body sections 3, 4, a wedge 33, 33'. The sealing plates 21 are arranged as stamp-and-bend portions. On each of the wedges 33', there is provided a bearing block 34 made of plastic. The legs of the leg pair 6, 7 are respectively secured to a wedge 33, 33' with a swivel axis 35. The wedges 33, 33' each provide, for an individual leg of the leg pair 6, 7, a swivel bearing. Similar to DE 10303115 A1, the leg pair is held by a stop mechanism 36 either in the storage configuration or the operative configuration. The stop mechanism 36 has a bolt which registers in stop openings corresponding to the storage or the operative mode. By the use of a handle 37, the bolt can be released from the stop position.

There is provided on each free end of a leg of each leg pair 7 an outwardly lying guide block 39. Attention is direction to the section of FIG. 19 which clarifies the further structure of the guide block 39. The guide blocks 34 have the same shape as the guide blocks 39. The guide blocks 39 are secured utilizing a threaded connection 40 near the free end of each leg of a leg pair 7. The guide block 39 forms an opening 41 in the mid region. A threaded bore 42 is provided in the radial direction with respect to the opening 41. A set screw 43 is screwed into the threaded bore 42. The guide blocks 34, 39 can each receive a wheel 44. The wheel 44 has an axis 45. The axis 45 has a circumferential groove 46, the position of which is so determined with respect to the threaded bore 42 that, in the inserted position, the axis 45 in the guide block 34 can, with help from the set-screw 43, be fixed in the axial position. Due to the securement with the set-screw 43, the axis 45 of the running wheel 44 cannot unintentionally be released from the opening 41 of the guide block 34, 39. Consequently, the running of the wheel 44 will not be impaired. The free end of each leg 7 is protected by the running surface of the wheel 44.

From the respective ends of the support body sections 3, 4 an elongation piece 48 projects through an opening 47 of the sealing plate 21. In the sectional view of FIG. 18, it is clearly seen that the profile body has a trapezoidal cross-section. The basis of the trapezoidal shape is dealt with above. The C-shaped elongate groove 53 runs in the middle region. The trapezoidal surface extending downward also has a mid-region elongate groove. The elongating portion 48 also has a trapezoidal cross section. The elongating pieces 48 lie respectively in a shape-resembling hollow 49 in the support body sections 3, 4. In FIG. 20, it can be seen that the elongating piece 48 can be fixed in any position utilizing a securement means 50. The securement means 50 consists of a handle 51 which is situated above the support body sections 3, 4, a groove following nut 52 which is guided in an elongate groove 53 of the support body sections 3, 4, and a clamp screw 54 which is connected with the handle 51 in a manner to resist rotation. In the groove following nut, there is a threaded bore 55, through which the clamping screw 54 projects. Around the head of the clamping screw 54 is provided a protective member 56. The protective member 56 prevents contamination of the basic surface 57, and also contributes to an improved securement of the elongation piece 48. The protection member 56 can, for example, be made of plastic or rubber. A securement means 50 exerts its effect on a base surface 57 of the respective elongation piece 48.

In known manner, workpiece supports 58 are provided for the free ends of the elongation pieces 48. The workpiece supports 58 can be secured at the various heights utilizing securement means 59.

In FIG. 7, it can be seen that, below the support body sections 3, 4, workpiece supporting arms 60 are provided. The workpiece support arms 60 are connected with the support body sections 3, 4 rotatively about a swivel point 61. The swivel point 61 is provided approximately in the middle under the support body sections 3, 4. The workpiece support arm 60 consists of bend portions (FIG. 2).

In the elongate groove 53 are led securement means for stops 62 and support plate holders 63. As is clear from FIGS. 17 and 20, the stops 62 and the support plate holder 63 are clamped by way of an eccentric snap closure 64 with profile bodies 3, 4. As can be seen in the operative configuration, the support plate holder 63 supports a support plate 65 for example for an oscillating saw. The support plates 65 can consist of MDF and are held by way of tension straps.

In the following part, the operation and example embodiment are described in greater detail. In FIGS. 1 through 7, the frame 1 is in the storage configuration. It can be seen that the support body sections 3, 4 are oriented parallel with one another. Also parallel to one another are the leg pairs 6, 7. In FIGS. 2, 3 and 5 it can be seen that the two support body sections 3, 4, by way of the closure 22, are maintained in the storage configuration. The running wheels 44 are mounted in the bearing blocks 34, which in turn are mounted on the wedges 33'. The running wheels 44 are mounted in the bearing blocks 34 which are supported on the wedges 33'. The running wheels 44 are fixed in place by way of the set-screws 43. Shifting now from the storage to the operative configuration, the first step is to open the closure 22 with the help of the closure lever 25. The closure lever 25 must be swivelled against the force applied by the swivel rotary spring 26. Once the closure 22 has been opened, the support body sections 3, 4 can be swivelled about the spring axis 10 through 180°. Now the support body sections 3, 4 will be lying in alignment one behind the other. In order to lock the support body sections 3, 4 in this condition, the captive member 17 must be reverse rotated about the axis 20 in the edge-opening notch 16 of the individual hinge halves 8, 9. After the tension bolt 18 lies in the edge-open notches 16 of the hinge halves 8, 9, the captive member 17 must be tightened with the tension lever 19. After the captive member 17 has been put into tension, the leg pairs 6, 7 can be switched from the storage configuration into the operative position. In order to be able to pivot the leg pairs 6, 7 about the swivel axis 35, the stop mechanism 36 must first be released. By way of the activation of the handle 37, the stop mechanism 36 is released from its grip with the wedges 33, 33', and the leg pairs 6, 7 can be swivelled to the operative configuration. When the leg pairs 6, 7 have reached the operative configuration, the stop mechanism 36 again stops and fixes the leg pairs 6, 7 in that condition. The stop mechanism 36 functions similarly to the description in VE10303115A1.

The operative configuration is illustrated with the help of FIGS. 8 through 14. In these figures it can be seen that, for example, the support plate holder 63 can receive a support plate 65. Likewise here, the stops 62, the work piece support 58 and the work piece supporting arms 60 are in their operative configuration. These can be variously positioned along their path of movement.

Figure 15:
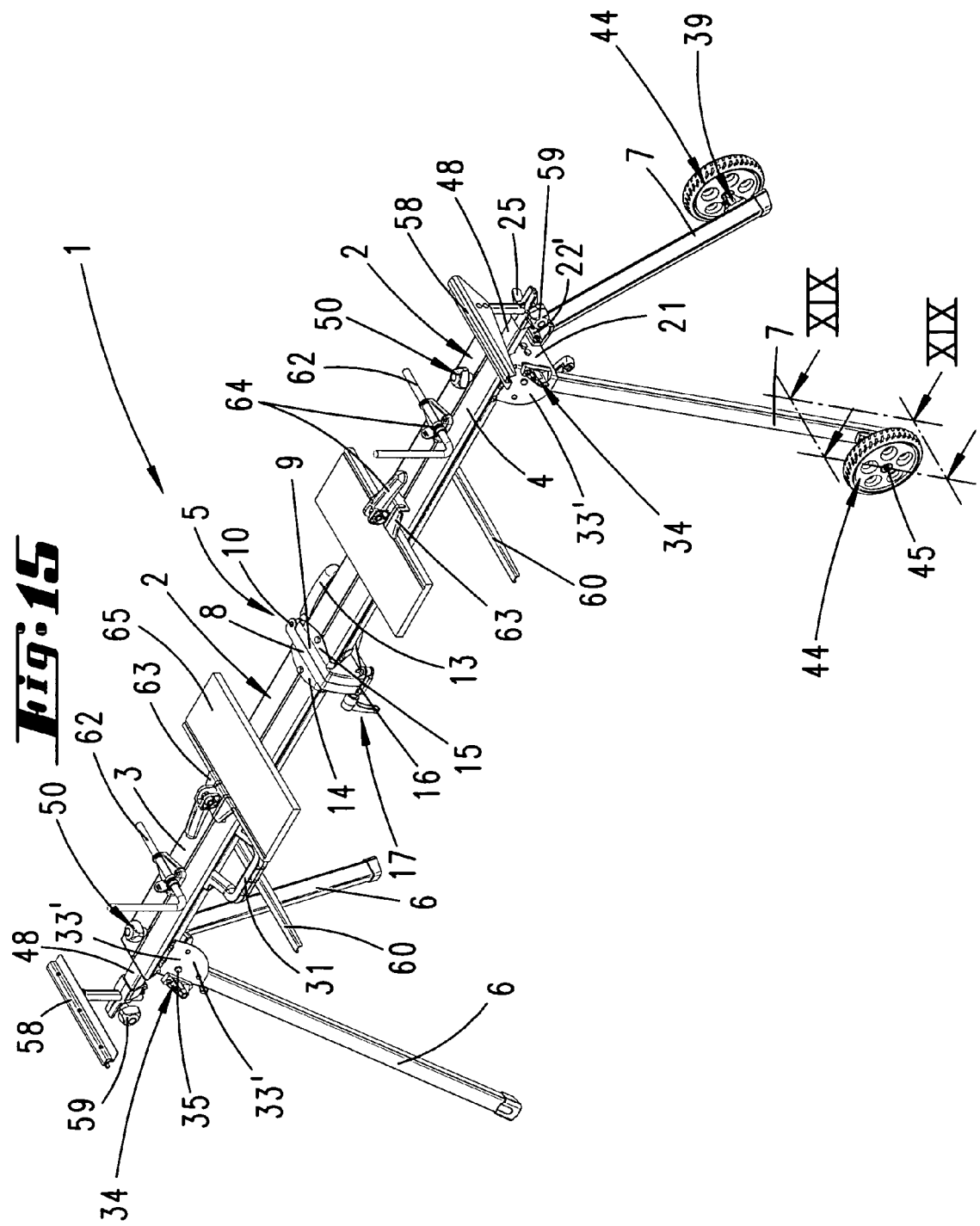
FIG. 15 is a perspective view similar to FIG. 8, except that in the Figure the running wheels are provided on the legs.

In FIG. 15, the running wheels 44 are decoupled from the bearing blocks 34 to the bearing blocks 39. In order to get the running wheels 44 out of the bearing blocks 34, the headless screw 43 must firstly be disengaged from its engagement with the circumferential groove 46. After this has been achieved, the axis 45 of the running wheel 44 can be pulled out of the opening 47. Thereafter, the axis 45 can be lodged in the opening 47 of the mounting blocks 39 and newly fixed with the help of the headless screw 43. Now it is possible to hoist the frame 1 onto the leg pair 6 and to displace it with the help of the running wheel 44.

In order to return the frame to the storage position, the running wheels 44 must again be de-mounted, the leg pair 6, 7 must be folded together and the support body sections 3, 4 must be brought into parallel alignment. In order to do this, the first task is to raise the stop mechanism 36 in order to fold the leg pair 6, 7 and to open the captive member 17, in order to swing the support body sections 3, 4 into a parallel condition. The closure 22 which holds the two support body sections 3, 4 in parallel condition, will stop by itself. This causes the stop hook 28 to run over the opposite stop hook 28'. Simultaneously the run-up ribs 30 of the closure lever 25 engage a control slope 29 of the stop hook 28', and swivel the closure lever 25 against the force of the swivel rotary spring 26 about the swivel axis 24. After the support body sections 3, 4 have been brought into parallel configuration, the closure lever 25, by reason of the force of the swivel rotation spring 26, is returned to its closure condition. Now the stop hook pocket 27 engages the stop hook 28, and secures the two support body sections 3, 4 to each other.

In the storage configuration it is possible to pull the folded-together frame 1 behind oneself. One grasps the frame 1 by the handle 13, and the running wheels 44 roll over the ground. In this fashion a simple transport for the frame 1 is possible. Because of its connection to the hinge axis 10, the grip 13 is rotatable. It can be rotated under the support body 2. In the storage condition, the handle 13 extends beyond the aligned front faces 11, 12 of the hinge 5.

In the operative configuration, the oscillating saw frame has sufficient length to work large work pieces. In the storage configuration, the oscillating saw frame becomes a compact object.

All disclosed characteristics are regarded as inventive. The disclosure of the application is considered to include also the disclosed content of the accompanying/attached priority documents (text of the prior application) with all contents, also with the purpose of including characteristics of the documents in the claims of the present application.

We claim:

1. A foldable frame for supporting an oscillating saw, the foldable frame comprising:

an elongated support body to which the oscillating saw is mountable, the elongated support body having: (a) a side; and (b) a plurality of support body sections, each one of the support body sections having an end;

a restraining member positioned adjacent to the side of the elongated support body, the restraining member including a tension rod;

a hinge pivotally coupling the support body sections to one another, the hinge, when in an operative configuration, being fixed with the restraining member; and a plurality of legs, at least one of the legs coupled to one of the ends, at least another one of the legs coupled to another one of the ends, the legs being movable from a storage configuration in which the legs extend substantially parallel to the elongated support body to an operative configuration in which the legs extend substantially perpendicular from the elongated support body, the support body sections being pivotable independent of one another by the hinge the support body sections in the storage configuration extending parallel to one another, and which by pivoting movement, the support body sections are configured to be brought into the operative configuration.

2. The foldable frame of claim 1, the hinge defining a hinge axis, the hinge axis extending vertically when in the operative configuration.

3. The foldable frame of claim 1, further comprising a closure securing one of the ends to another of the ends in the storage configuration.

4. The foldable frame of claim 3, the closure including a spring-biased stop hook.

5. The foldable frame of claim 1, each one of the support body sections at least partially including a trapezoidal cross section.

6. The foldable frame of claim 1, further comprising a plurality of elongation members, each one of the elongation members extending into one of the support body sections, the elongation members configured to be withdrawn from one of the ends.

7. The foldable frame of claim 1, the hinge including a plurality of hinge halves, the tension rod being coupled to one of the hinge halves, and in a restrained condition the tension rod projecting through at least one notch.

8. The foldable frame of claim 1, the hinge forming a plurality of hinge halves with a plurality of front faces, such that at least portions of the front faces contact one another in the operative configuration and extend adjacent to one another in the storage configuration.

9. The foldable frame of claim 8, further comprising a handle positioned adjacent to the hinge, a portion of the hinge extending along a hinge axis, the handle being secured to the portion.

10. The foldable frame of claim 9, the handle when in the operative configuration being positioned under the hinge halves, and in the storage condition, the handle being positioned ahead of the front faces.

11. The foldable frame of claim 1, one of the support body sections including a side, the foldable frame further comprising a support handle positioned adjacent to the side.

12. The foldable frame of claim 1, the support body sections being aligned with one another in the operative configuration.

13. The foldable frame of claim 12, each one of the support body sections at least partially including a trapezoidal cross section.

14. The foldable frame of claim 12, the hinge including a plurality of hinge halves, each one of the hinge halves defining a pocket, each one of the support body sections projecting into one of the pockets.

15. The foldable frame of claim 12, further comprising a plurality of elongation members, each one of the elongation members extending into one of the support body sections, the elongation members configured to be withdrawn from one of the ends.

16. The foldable frame of claim 15, each one of the elongation members including a trapezoidal cross-section.

17. The foldable frame of claim 16, each one of the elongation members including a plurality of base surfaces, the foldable frame further comprising a securement means configured to secure at least one the base surfaces in position.

18. The foldable frame of claim 12, further comprising a plurality of stops, at least one of the stops coupled to at least one of the support body sections.

19. The foldable frame of claim 18, further comprising a plurality of support plate holders, at least one of the support plate holders coupled to at least one of the support body sections.

20. A foldable frame for supporting an oscillating saw, the foldable frame comprising:
an elongated support body to which the oscillating saw is mountable, the elongated support body having a plurality of support body sections, each one of the support body sections having an end;
a plurality of running wheels including a first running wheel positioned adjacent to one of the ends and a second running wheel positioned adjacent to another of the ends, the wheels, when in storage configuration, being substantially co-axial with respect to one another;
a hinge pivotally coupling the support body sections to one another; and
a plurality of legs, at least one of the legs coupled to one of the ends, at least another one of the legs coupled to another one of the ends, the legs being movable from a storage configuration in which the legs extend substantially parallel to the elongated support body to an operative configuration in which the legs extend substantially perpendicular from the elongated support body,
the support body sections being pivotable independent of one another by the hinge the support body sections in the storage configuration extending parallel to one another, and which by pivoting movement, the support body sections are configured to be brought into the operative configuration.

21. A foldable frame for supporting an oscillating saw, the foldable frame comprising:
an elongated support body to which the oscillating saw is mountable, the elongated support body having a plurality of support body sections, each one of the support body sections having an end;
a hinge pivotally coupling the support body sections to one another;
a plurality of legs, at least one of the legs coupled to one of the ends, at least another one of the legs coupled to another one of the ends, the legs being movable from a storage configuration in which the legs extend substantially parallel to the elongated support body to an operative configuration in which the legs extend substantially perpendicular from the elongated support body; and
a plurality of wedges and a plurality of running wheels, at least one of the running wheels and at least one of the legs being connected to at least one of the wedges,
the support body sections being pivotable independent of one another by the hinge the support body sections in the storage configuration extending parallel to one another, and which by pivoting movement, the support body sections are configured to be brought into the operative configuration.

22. A foldable frame for supporting an oscillating saw, the foldable frame comprising:
an elongated support body to which the oscillating saw is mountable, the elongated support body having a plurality of support body sections, each one of the support body sections having an end;
a hinge pivotally coupling the support body sections to one another;
a plurality of bearing blocks, each one of the bearing blocks defining at least one openings;

a plurality of running wheels, each one of the running wheels extend along an axis projecting into one of the openings; and a plurality of legs, at least one of the legs coupled to one of the ends, at least another one of the legs coupled to another one of the ends, the legs being movable from a storage configuration in which the legs extend substantially parallel to the elongated support body to an operative configuration in which the legs extend substantially perpendicular from the elongated support body, the support body sections being pivotable independent of one another by the hinge the support body sections in the storage configuration extending parallel to one another, and which by pivoting movement, the support body sections are configured to be brought into the operative configuration.

23. A foldable frame for supporting an oscillating saw, the foldable frame comprising:

an elongated support body to which the oscillating saw is mountable, the elongated support body having a plurality of support body sections, each one of the support body sections having an end;

a hinge pivotally coupling the support body sections to one another;

a plurality of legs, each of the legs including a free end;

a plurality of running wheels, each of the running wheels corresponding to at least one free end; and at least one of the legs coupled to one of the ends of the elongated support body sections, at least another one of the legs coupled to another one of the ends of the elongated support body sections, the legs being movable from a storage configuration in which the legs extend substantially parallel to the elongated support body to an operative configuration in which the legs extend substantially perpendicular from the elongated support body, the support body sections being pivotable independent of one another by the hinge the support body sections in the storage configuration extending parallel to one another, and which by pivoting movement, the support body sections are configured to be brought into the operative configuration.

24. A foldable frame comprising:

an elongated support body having a plurality of support body sections, a first end, and a second end, the elongated support body being configured to support a saw;

at least one wheel coupled to at least one of the first and second ends;

a joint pivotally coupling the support body sections to one another, the support body sections being pivotal relative to one another; and a plurality of legs, at least one of the legs being coupled to the first end, at least another one of the legs being coupled to the second end.

25. The foldable frame of claim 24, the elongated support body having a plurality of sides and a top, the top extending in a plane, the joint including a hinge, the hinge defining a hinge axis, the hinge axis being positioned adjacent to one of the sides of the elongated support body, the hinge axis extending perpendicular to the plane.

26. The foldable frame of claim 24, further comprising a plurality of leg joints, each one of the legs being pivotable with respect to one of the elongated support body sections at one of the leg joints such that in an operative position, the legs extend substantially perpendicularly to the plane, and in a storage position, the legs extend substantially parallel to the plane.

27. The foldable frame of claim 24, the joint including a hinge, the hinge defining a hinge axis and having an underside, and further comprising a handle coupled to the underside.

28. The foldable frame of claim 27, the handle being rotatable and coupled to the hinge adjacent to the hinge axis.

29. The foldable frame of claim 24, a plurality of wedges, at least one of the wheels and at least one of the legs being connected to at least one of the wedges.

30. The foldable frame of claim 24, the elongated support body having a plurality of sides, the at least one wheel being coupled to the elongated support body adjacent to at least one of the sides.

31. A foldable frame comprising:

an elongated support body having a plurality of support body sections, a first end, and a second end, the elongated support body being configured to support a saw;

a joint pivotally coupling the support body sections to one another, the support body sections being pivotal relative to one another;

a plurality of legs, at least one of the legs being coupled to the first end, at least another one of the legs being coupled to the second end; and at least one wheel, each one of the legs including a free end, the at least one wheel coupled to one of the free ends.

32. The foldable frame of claim 24, each one of the support body sections comprising an extension section configured to telescopically extend from the support body section.

33. The foldable frame of claim 24, the joint being positioned between the plurality of support body sections.

34. A foldable frame comprising:

an elongated support body having a plurality of support body sections, a first end, a second end, a plurality of sides and a top, the top extending in a plane, the elongated support body configured to support a saw;

a plurality of wheels, including a first wheel being coupled to the first end and a second wheel being coupled to the second end;

a joint pivotally coupling the support body sections to one another, the joint including a hinge, the hinge defining a hinge axis, the hinge axis extending substantially perpendicular to the plane; and a plurality of legs coupled to the elongated support body, at least one of the legs being positioned at the first end, at least another one of the legs being positioned at the second end.

35. The foldable frame of claim 34, the support body sections configured to pivot independently of one another.

36. The foldable frame of claim 34, the joint including a handle, the handle coupled to the hinge axis.

37. The foldable frame of claim 36, the handle positioned under the hinge halves and in the storage condition, the handle being positioned ahead of the front faces.

38. The foldable frame of claim 34, further comprising a closure securing the first end to the second end in a storage configuration.

39. The foldable frame of claim 34, the plurality of sides of the elongated support body extending parallel to one another in a storage configuration.

* * * * *